May 1, 1934.   R. HOWARD   1,957,013
COMBINATION DRIPPING PAN
Filed Jan. 7, 1932
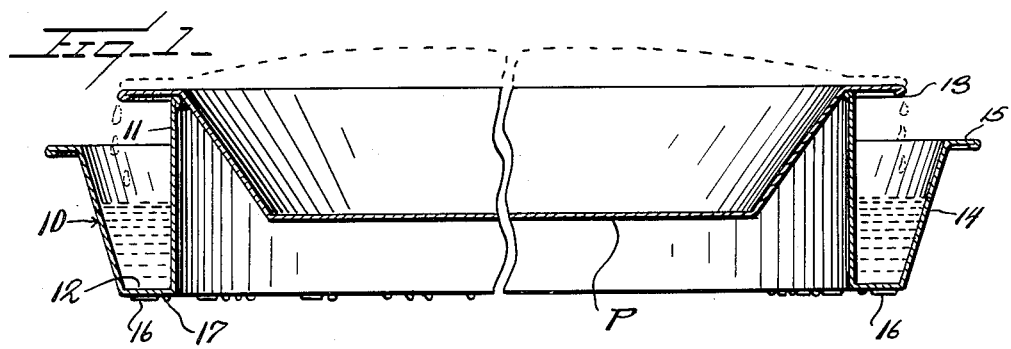
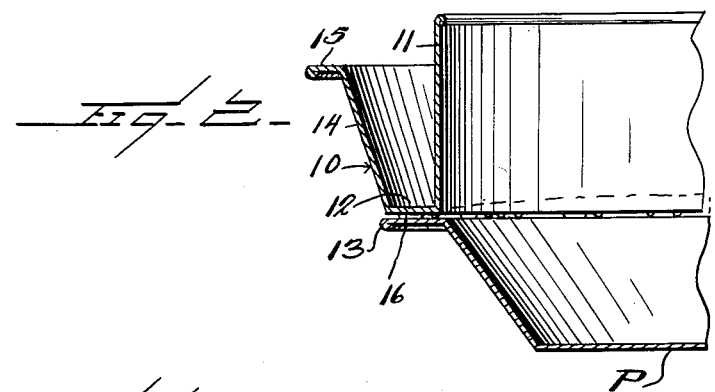
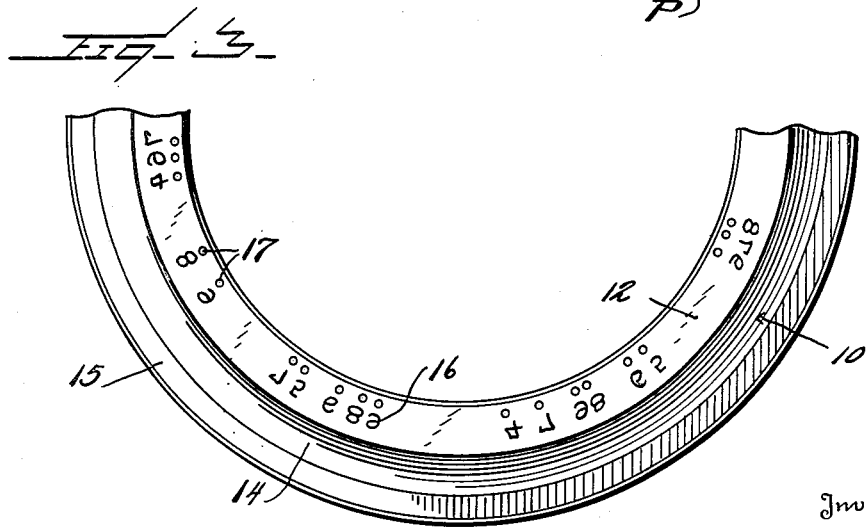
Inventor
R. Howard
By Watson E. Coleman
Attorney Patented May 1, 1934

1,957,013

UNITED STATES PATENT OFFICE 1,957,013

COMBINATION DRIPPING PAN

Richard Howard, Los Angeles, Calif.

Application January 7, 1932, Serial No. 585,332

1 Claim. (Cl. 53—6)

This invention relates to baking devices, and more particularly to a device for use with a pie pan whereby the drippings from the pan will be prevented from dropping onto the bottom of the oven.

Another object of this invention is to provide a device of this kind which is constructed to receive water so that the steam formed by heating of the water in the oven coactive with the baking of the pie in the pan supported by the device will prevent burning or undue baking of the peripheral edges of the pie.

A further object of this invention is to provide a device of this kind which will not only catch the juices exuding from the pie but which will dissolve these juices so that when the pie is completely baked, the dissolved juices may be drained off without incrusting the bottom of the oven or the bottom of the catching means.

A still further object of this invention is to provide an improved pie baking pan which is so constructed as to provide means in the crust of the pie so that the pie may be cut in any desired number of pieces without the use of a separate measuring device.

The above and various other objects and advantages of this invention will in part be described in and in part be understood from the following detailed description of the present preferred embodiment, the same being illustrated in the accompanying drawing, wherein:—

Figure 1 is a fragmentary sectional view through a pie pan supported by the invention hereinafter described;

Figure 2 is a fragmentary sectional view showing the manner in which the device is used for marking the divisional indications on the edge of the pie;

Figure 3 is a fragmentary bottom plan view of the device showing the divisional markings in inverted or reversed form.

Referring to the drawing wherein like numerals of reference designate corresponding parts throughout the several views, the letter P designates generally a pie pan of conventional construction which is provided with an outstanding rim or flange 13. In order to provide means whereby the pie pan P may be supported within the oven so as to prevent the bottom of this pan from contacting with any portion of the oven and particularly the bottom of the oven, I have provided a pan supporting means, generally designated as 10, which is constructed in ring-shaped form having an inner substantially vertical wall 11 which engages against the lower surface of the flange 13 of the pan P so as to removably support this pan in upwardly spaced relation to the bottom 12 of this pan supporting means 10.

The outer wall 14 of this pan supporting means 10 is preferably outwardly inclined and terminates at the upper end thereof in an outwardly extending rim or flange 15 which is disposed below the top of the inner wall 11. This pan supporting means 10 is constructed in annular form and provides a liquid reservoir between the inner wall 11 and the outer wall 14 within which a predetermined quantity of water may be positioned so that during the process of the baking of the pie in the pan P, the drippings or juices exuding from this pie will run over the edge 13 and drop into the water disposed in the reservoir formed between the inner and the outer walls 11 and 14, respectively. Furthermore, during the baking of the pie, the water in this reservoir will become heated and the moist vapors or steam arising therefrom will contact with the peripheral edge of the pie and operate to keep this edge moistened and will tend to retard the baking of the pie at the edges thereof so that the edges will not burn or become unduly browned until the center or body of the pie has been thoroughly baked.

In actual practice, the pan supporting device 10 is constructed to hold a full cup of liquid but preferably the device is only half filled so that when the juices in the pie drop into the reservoir, the reservoir will not overflow and thereby defeat the purpose for which the device has been designed, namely, that of preventing the juices from dropping onto the bottom of the oven and burning.

The bottom 12 of this device is provided at desired points with detents 16 which are pressed downwardly from the inner side thereof so that these detents 16 will project below the bottom 12. These detents 16 are preferably in the form of numerals or the like which are pressed backwards so that when the bottom 12 is placed on the top of the rim of the pie engaged with the flange 13, these detents or numerals 16 will be impressed in the upper crust of the pie and will provide markings for cutting the pie into any desired number of pieces of equal size.

The bottom 12 is also provided with dots or detents 17 spaced inwardly from the numerals 16, the spacing between selected pairs of dots 17 and the center of the pie forming equal divisions so that the desired number of pieces of equal size may be cut in the pie. The bottom 12 is preferably of a size substantially equal in diameter to the diameter of the rim 13 of the pie so that after the pie has been placed in the pan P, the liquid holding member 10 may be placed on the crust of the pie concentrically thereof and the bottom 12 will lie flat on the edge of the pie crust engaged with the rim 13.

It will be obvious from the foregoing that the liquid holding member 10 may be made of any desired size or capacity and that the inner wall 11 of the device may be of any suitable length or height to support the pie pan P in a position where the bottom thereof will be disposed spaced upwardly from the bottom of the oven or from the support engaged by the bottom 12 of this pie pan supporting member 10.

In the use of this device, the pie pan P is adapted to receive the desired pie crust and after the pie crust is filled with the desired filling and before the pan is placed in the oven, the bottom 12 of the pan supporting member 10 is engaged with the crust of the pie and pressed downwardly so that the detents 16 and 17 will form marking in the unbaked crust.

While these markings may not be as clear after the pie is baked as they are when initially placed in the crust, they will, nevertheless remain in the crust during the baking thereof, and will form means by which any desired number of pieces of pie of equal size may be cut. The pie pan supporting member 10 with the desired quantity of liquid placed therein may be then placed in the oven and the pan P positioned concentrically of the inner wall 11 so that the top of this wall 11 will engage the flange 13 of the pan P. The pie may then be baked for the usual length of time and any juices exuding from the pie will drop into the water positioned in this pan supporting member 10 and the heating of this water will cause a moistened vapor or steam to rise and this vapor or steam will maintain the ege of the pie moistened so as to retard the baking thereof until the center or body of the pie has become thoroughly baked. The juices dripping out of the pie will drop into the water and become dissolved thereby so that when the pie is entirely baked, the water containing the diluted juices may be poured out of this pan supporting member 10.

It is, of course, understood that various changes and modifications may be made in the details of construction and design of the above specifically described embodiment of this invention without departing from the spirit thereof, such changes and modifications being restricted only by the scope of the following claim.

What is claimed is:—

In combination with a pan having a peripheral horizontal flange, of a water receiving support comprising a receptacle with upwardly extending sides, the inner one larger than the outer, and of such height as to hold the pan above the supporting surface with the outer edge of the rim positioned between the upstanding sides the outer side being flared outwardly to permit the use of the support with pans having rims of varying sizes.

RICHARD HOWARD.